United States Patent
Ohkuma et al.

(10) Patent No.: US 9,346,458 B2
(45) Date of Patent: May 24, 2016

(54) DEVICE FOR CONTROLLING HYBRID VEHICLE ENGINE CRANKSHAFT STOP POSITION

(75) Inventors: Hitoshi Ohkuma, Hamamatsu (JP); Yoshiki Ito, Hamamatsu (JP); Masakazu Saito, Hamamatsu (JP); Masaaki Tagawa, Hamamatsu (JP); Yukihiro Hosoe, Hamamatsu (JP)

(73) Assignee: SUZUKI MOTOR CORPORATION, Hamamatsu-shi, Shizuoka (JP)

( * ) Notice: Subject to any disclaimer, the term of this patent is extended or adjusted under 35 U.S.C. 154(b) by 56 days.

(21) Appl. No.: 13/985,180

(22) PCT Filed: Feb. 17, 2011

(86) PCT No.: PCT/JP2011/053365
§ 371 (c)(1),
(2), (4) Date: Nov. 25, 2013

(87) PCT Pub. No.: WO2012/111123
PCT Pub. Date: Aug. 23, 2012

(65) Prior Publication Data
US 2014/0074333 A1 Mar. 13, 2014

(51) Int. Cl.
*B60W 20/00* (2006.01)
*B60K 6/445* (2007.10)
(Continued)

(52) U.S. Cl.
CPC ............... *B60W 20/00* (2013.01); *B60K 6/445* (2013.01); *B60W 10/06* (2013.01); *B60W 10/08* (2013.01); *F02D 17/04* (2013.01); *F02D 29/02* (2013.01);
(Continued)

(58) Field of Classification Search
CPC ............... F02N 2019/008; B60W 2510/0685; B60W 2710/0661; F02D 41/042
See application file for complete search history.

(56) References Cited

U.S. PATENT DOCUMENTS 6,807,476 B2 * 10/2004 Ando et al. ............... 701/110
6,873,930 B2 * 3/2005 Hirn ........................ 702/142
(Continued)

FOREIGN PATENT DOCUMENTS

JP 2005-16505 A 1/2005
JP 2009-74390 A 4/2009
(Continued)

OTHER PUBLICATIONS

Form PCT/ISA/210 International Search Report issued in International Application PCT/JP2011/053365 with English translation, date of mailing Jun. 14, 2011 (5 pages).

*Primary Examiner* — Todd Melton
(74) *Attorney, Agent, or Firm* — Flynn, Thiel, Boutell & Tanis, P.C.

(57) ABSTRACT

A process in which a crank angle predicted stop position is calculated based on a target engine rotation speed reduction rate that is calculated in advance, a crank angle integration target value is calculated based on the crank angle predicted stop position, the target engine rotation speed reduction rate is recalculated based on the crank angle integration target value and an actual crank angle, a target crank angle is calculated based on the crank angle integration target value and the target engine rotation speed reduction rate, a crank deviation angle is calculated based on the target crank angle and the actual crank angle, a crank angle feedback torque of the motor is calculated based on the crank angle deviation angle, and a torque instruction value of the motor is calculated by adding the basic torque of the motor and the crank angle feedback torque when the engine is stopped.

4 Claims, 9 Drawing Sheets

(51) Int. Cl.
*B60W 10/06* (2006.01)
*B60W 10/08* (2006.01)
*F02D 17/04* (2006.01)
*F02D 29/02* (2006.01)
*F02N 19/00* (2010.01)
*F02D 41/04* (2006.01)
*B60W 50/00* (2006.01)

(52) U.S. Cl.
CPC ...... *F02N 19/005* (2013.01); *B60W 2050/0008* (2013.01); *B60W 2510/0657* (2013.01); *B60W 2510/0685* (2013.01); *B60W 2710/0661* (2013.01); *B60W 2710/0666* (2013.01); *F02D 41/042* (2013.01); *F02N 2019/008* (2013.01); *F02N 2300/104* (2013.01); *Y02T 10/6239* (2013.01); *Y02T 10/6286* (2013.01); *Y02T 10/84* (2013.01); *Y10S 903/93* (2013.01)

(56) References Cited

U.S. PATENT DOCUMENTS

| | | | |
|---|---|---|---|
| 7,217,221 B2 * | 5/2007 | Sah et al. | 477/3 |
| 7,228,209 B2 | 6/2007 | Izawa et al. | |
| 7,653,478 B2 * | 1/2010 | Park | 701/112 |
| 8,210,294 B2 * | 7/2012 | Hughes et al. | 180/65.285 |
| 2004/0255904 A1 | 12/2004 | Izawa et al. | |
| 2007/0151536 A1 * | 7/2007 | Yamauchi et al. | 123/179.4 |
| 2007/0233357 A1 * | 10/2007 | Sugai et al. | 701/105 |
| 2010/0036590 A1 * | 2/2010 | Nakai | 701/112 |
| 2010/0204908 A1 | 8/2010 | Nakai | |

FOREIGN PATENT DOCUMENTS

| | | |
|---|---|---|
| JP | 2009-234364 A | 10/2009 |
| JP | 2010-43534 A | 2/2010 |
| JP | 2010-209891 A | 9/2010 |

* cited by examiner

TARGET DRIVING FORCE SEARCH MAP

TARGET CHARGE/DISCHARGE POWER SEARCH TABLE

TARGET ENGINE OPERATING POINT SEARCH MAP

ENGINE TARGET ROTATION SPEED AND UPPER LIMIT
VALUE AND LOWER LIMIT VALUE OF REDUCTION RATE

MG1 CRANK ANGLE FEEDBACK TORQUE SEARCH TABLE

CRANK ANGLE TARGET VALUE OFFSET (A)

(B)

DEVICE FOR CONTROLLING HYBRID VEHICLE ENGINE CRANKSHAFT STOP POSITION

TECHNICAL FIELD

The present invention relates to a control device for a hybrid vehicle which controls the driving of the vehicle using outputs of an engine and a motor and, more particularly, to a control device for a hybrid vehicle that performs a control such that a crankshaft is stopped at a target crank angle at the time of the stopping of the engine.

BACKGROUND ART

Conventionally, in controlling an engine of a hybrid vehicle driven mainly using the outputs of an engine and a motor (motor generator) so as to be stopped, in order to stop a crank angle of a crankshaft of the engine at a target stop position, a control device as disclosed in Japanese Patent Application Laid-Open (JP-A) No. 2005-016505 is proposed.

According to such a conventional technology, the moving amount of a target crank angle is calculated based on an engine rotation speed at the time of starting an engine stopping process, a time required for the engine stopping process, and a difference between the position of the crankshaft of the engine at the time of starting a stopping process and the stop position of a target crank angle. A target engine rotation speed reduction rate is calculated based on the amount of movement, the amount of integrated movement of the crank angle from the start of an engine stopping process up to now, and a time required for stopping the engine, a target engine rotation speed is calculated, the engine rotation speed is controlled so as to approach the target engine rotation speed by using a first motor generator (hereinafter, referred to as "MG1") and a second motor generator (hereinafter, referred to as "MG2"), and crank angle stopping control is performed such that the crank angle of the engine is finally located at the target stop position.

CITATION LIST

Patent Literature

PTL 1 JP-A No. 2005-016505

SUMMARY OF INVENTION

Technical Problem

However, in the conventional technology disclosed in JP-A No. 2005-016505 described above, there is a problem in that the crank angle of the engine does not stop at the target stop position in a case where there is a delay time in the communication between a motor generator and a controller.

In addition, in the conventional technology described above, when the engine rotation speed is a predetermined rotation speed or less, the target torque of the motor generator is configured to be zero so as to prevent resonance. However, there is a problem in that the control of stopping the crank angle is not operated at a predetermined rotation speed or less, and the crank angle does not stop at the target stop position.

Furthermore, in the conventional technology described above, since the calculation of the movement amount of the target crank angle is performed at the time of starting the engine stopping process, in a case where the engine rotation speed rapidly changes during the engine stopping process, the motor generator outputs feedback torque for correction, and there is a problem in that the torque is output to a driving shaft leading to the degradation of the drivability.

According to the present invention, a crankshaft of an engine can be stopped at a target crank angle stop position in a hybrid vehicle, and an object thereof is to realize a control device for a hybrid vehicle that can stop the crankshaft of the engine accurately at the target crank angle stop position even immediately before stopping the engine.

Solution to Problem

According to the present invention, in a control device of a hybrid vehicle that controls driving of the vehicle using outputs of an engine and a motor, a process is periodically performed in which a crank angle predicted stop position is calculated based on a target engine rotation speed reduction rate that is calculated in advance, a crank angle integration target value is calculated based on the crank angle predicted stop position, the target engine rotation speed reduction rate is recalculated based on the crank angle integration target value and an actual crank angle, a target crank angle is calculated based on the crank angle integration target value and the target engine rotation speed reduction rate, a crank deviation angle is calculated based on the target crank angle and the actual crank angle, crank angle feedback torque of the motor is calculated based on the crank angle deviation angle, and a torque instruction value of the motor is calculated by adding basic torque of the motor and the crank angle feedback torque when the engine is stopped.

Advantageous Effects of Invention

According to the present invention, crank angle stopping control is periodically performed based on the reduction rate of a target engine rotation speed that has been calculated, and accordingly, the crankshaft of the engine can be stopped at the target crank angle stop position while preventing an abrupt change in the reduction rate of the target engine rotation speed.

According to the present invention, since the crank angle feedback torque of a motor is calculated based on a crank deviation angle, the crank angle feedback torque can be applied such that the crankshaft of the engine is stopped accurately at the target crank angle stop position even immediately before stopping the engine.

According to the present invention, by stopping the crankshaft of the engine at the target crank angle stop position, thereafter, the engine can be started up with an optimized crank angle, and accordingly, the occurrence of a shock accompanied with the start-up of the engine can be prevented.

In addition, according to the present invention, after the engine is stopped, the crankshaft does not need to be moved to a position of an optimal crank angle, and accordingly, a torque variation due to rotation of the crankshaft does not occur. Furthermore, when the engine is started up, the crankshaft does not need to be moved to the position of an optimal crank angle, and accordingly, the timing for starting up the engine is not delayed. Accordingly, when the engine is started up, no sense of discomfort is given to a driver.

DESCRIPTION OF EMBODIMENTS

Hereinafter, an embodiment of the present invention will be described with reference to the drawings.

Embodiments

Figure 1:
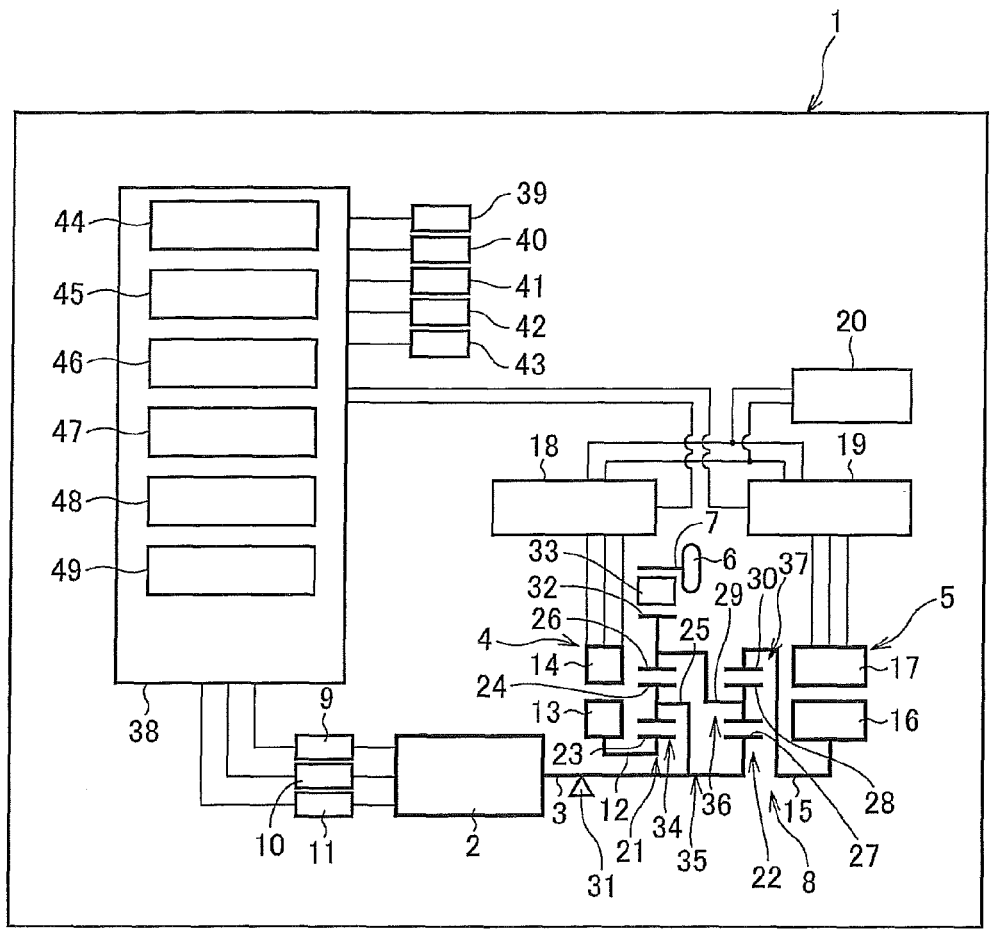
FIG. 1 is a system configuration diagram of a control device of a hybrid vehicle.

FIGS. 1 to 14 illustrate an embodiment of the present invention. In FIG. 1, reference numeral 1 represents a control device of a hybrid vehicle. The control device 1 of the hybrid vehicle, as a driving system, includes: an output shaft 3 of an engine 2 that generates a driving force in accordance with the combustion of fuel; a first motor generator 4 and a second motor generator 5 that generate a driving force using electricity and generate electrical energy through driving; a driving shaft 7 that is connected to a drive wheel 6 of the hybrid vehicle, and a differential gear mechanism 8 that is a power transmission system connected to the output shaft 3, the first and second motor generators 4 and 5, and the driving shaft 7.

The engine 2 includes: an air content adjusting means 9 such as a throttle valve that adjusts the air volume to be suctioned in accordance with the accelerator opening degree (the amount of pressing an accelerator pedal using a foot); a fuel supplying means 10 such as a fuel injection valve that supplies fuel corresponding to the suctioned air volume; and an ignition means 11 such as an ignition device that ignites the fuel. In the engine 2, the combustion state of the fuel is controlled by the air content adjusting means 9, the fuel supplying means 10, and the ignition means 11, and a driving force is generated by the combustion of the fuel.

The first motor generator 4 includes: a first motor rotor shaft 12; a first motor rotor 13; and a first motor stator 14. The second motor generator 5 includes: a second motor rotor shaft 15; a second motor rotor 16; and a second motor stator 17. The first motor stator 14 of the first motor generator 4 is connected to a first inverter 18. The second motor stator 17 of the second motor generator 5 is connected to a second inverter 19.

The power terminals of the first and second inverters 18 and 19 are connected to a battery 20. The battery 20 is an electricity accumulating means that can exchange electric power between the first motor generator 4 and the second motor generator 5. The first motor generator 4 and the second motor generator 5 generate driving forces in accordance with electricity of which the amount of electricity supplied from the battery 20 is controlled by the first and second inverters 18 and 19 and generate electrical energy using the driving force supplied from the drive wheel 6 at the time of regeneration and store the generated electrical energy in the battery 20 to be charged.

The differential gear mechanism 8 includes a first planetary gear mechanism 21 and a second planetary gear mechanism 22. The first planetary gear mechanism 21 includes: a first sun gear 23; a first planetary carrier 25 supporting a first planetary gear 24 engaged with the first sun gear 23; and a first ring gear 26 that is engaged with the first planetary gear 24. The second planetary gear mechanism 22 includes: a second sun gear 27; a second planetary carrier 29 supporting a second planetary gear 28 engaged with the second sun gear 27; and a second ring gear 30 that is engaged with the second planetary gear 28.

The differential gear mechanism 8 arranges the rotational center lines of the rotating components of the first planetary gear mechanism 21 and the second planetary gear mechanism 22 on the same axis, arranges the first motor generator 4 between the engine 2 and the first planetary gear mechanism 21, and arranges the second motor generator 5 on a side of the second planetary gear mechanism 22 that is separated away from the engine 2.

The first motor rotor shaft 12 of the first motor generator 4 is connected to the first sun gear 23 of the first planetary gear mechanism 21. The first planetary carrier 25 of the first planetary gear mechanism 21 and the second sun gear 27 of the second planetary gear mechanism 22 are connected to the output shaft 3 of the engine 2 in a combined manner through a one-way clutch 31. The first ring gear 26 of the first planetary gear mechanism 21 and the second planetary carrier 29 of the second planetary gear mechanism 22 are combined and are connected to an output unit 32. The output unit 32 is connected to the driving shaft 7 through an output transmission mechanism 33 such as a gear or a chain. The second motor rotor shaft 15 of the second motor generator 5 is connected to the second ring gear 30 of the second planetary gear mechanism 22.

The one-way clutch 31 is a mechanism that fixes the output shaft 3 of the engine 2 so as to rotate only in the output direction and prevents the output shaft 3 of the engine 2 from reversely rotating. The driving power of the second motor generator 5 is transmitted as driving power of the output unit 32 through a reaction force of the one-way clutch 31.

The hybrid vehicle outputs the power generated by the engine 2 and the first and second motor generators 4 and 5 to the driving shaft 7 through the first and second planetary gear mechanisms 21 and 22, thereby driving the drive wheel 6. In addition, the hybrid vehicle transmits the driving force delivered from the drive wheel 6 to the first and second motor generators 4 and 5 through the first and second planetary gear mechanisms 21 and 22, thereby generating electrical energy so as to charge the battery 20.

The differential gear mechanism 8 sets four rotating components 34 to 37. The first rotating component 34 is formed by the first sun gear 23 of the first planetary gear mechanism 21. The second rotating component 35 is formed by combining the first planetary carrier 25 of the first planetary gear mechanism 21 and the second sun gear 27 of the second planetary gear mechanism 22. The third rotating component 36 is formed by combining the first ring gear 26 of the first planetary gear mechanism 21 and the second planetary carrier 29 of the second planetary gear mechanism 22. The fourth rotating component 37 is formed by the second ring gear 30 of the second planetary gear mechanism 22.

The differential gear mechanism 8, on an alignment chart in which the rotation speeds of four rotating components 34 to 37 can be represented as a straight line, sets the four rotating components 34 to 37 as the first rotating component 34, the second rotating component 35, the third rotating component 36, and the fourth rotating component 37 from one end toward the other end. A ratio of distances among the four rotating components 34 to 37 is represented as k1:1:k2.

The first motor rotor shaft 12 of the first motor generator 4 is connected to the first rotating component 34. The output shaft 3 of the engine 2 is connected to the second rotating component 35 through the one-way clutch 31. The output unit 32 is connected to the third rotating component 36. The driving shaft 7 is connected to the output unit 32 through the output transmission mechanism 33. The second motor rotor shaft 15 of the second motor generator 5 is connected to the fourth rotating component 37.

From this, the differential gear mechanism 8 includes the four rotating components 34 to 37 connected to the output shaft 3, the first motor generator 4, the second motor generator 5, and the driving shaft 7 and transmits and receives power to/from the output shaft 3 of the engine 2, the first motor generator 4, the second motor generator 5, and the driving shaft 7. Accordingly, the control device 1 employs the control form of the "four-axis type".

The differential gear mechanism 8 formed by the first and second planetary gear mechanisms 21 and 22 aligns the four rotating components 34 to 37 in order of the first rotating component 34 connected to the first motor generator 4, the second rotating component 35 connected to the output shaft 3 of the engine 2, the third rotating component 36 connected to the driving shaft 7, and the fourth rotating component 37 connected to the second motor generator 5 in order from one end toward the other in the alignment chart, and the mutual lever ratio of such rotating components 34 to 37 is arranged as k1:1:k2 in the same order.

Here, values k1 and k2 determined based on the gear ratio of the differential gear mechanism 8 formed by the first and second planetary gear mechanisms 21 and 22 are defined as below.

$k1 = ZR1/ZS1$
$k2 = ZS2/ZR2$
ZS1: the number of teeth of first sun gear
ZR1: the number of teeth of first ring gear
ZS2: the number of teeth of second sun gear
ZR2: the number of teeth of second ring gear The control device 1 of the hybrid vehicle connects the air content adjusting means 9, the fuel supplying means 10, the ignition means 11, the first inverter 18, and the second inverter 19 to a control unit 38. In addition, an accelerator opening degree detecting means 39, a vehicle speed detecting means 40, an engine rotation speed detecting means 41, a battery charge state detecting means 42, and a crank angle detecting means 43 are connected to the control unit 38.

The accelerator opening degree detecting means 39 detects the accelerator opening degree that is the amount of pressing the accelerator pedal using a foot. The vehicle speed detecting means 40 detects a vehicle speed (car speed) of the hybrid vehicle. The engine rotation number detecting means 41 detects the engine rotation speed of the engine 2. The battery charge state detecting means 42 detects the charge state SOC of the battery 20. The crank angle detecting means 43 detects an actual crank angle of the crankshaft of the engine 2.

In addition, the control unit 38 includes: target driving force setting means 44; target driving power setting means 45; a target charge/discharge power setting means 46; a target engine power calculating means 47; a target engine operating point setting means 48; and a motor torque instruction value calculating means 49.

Figure 2:
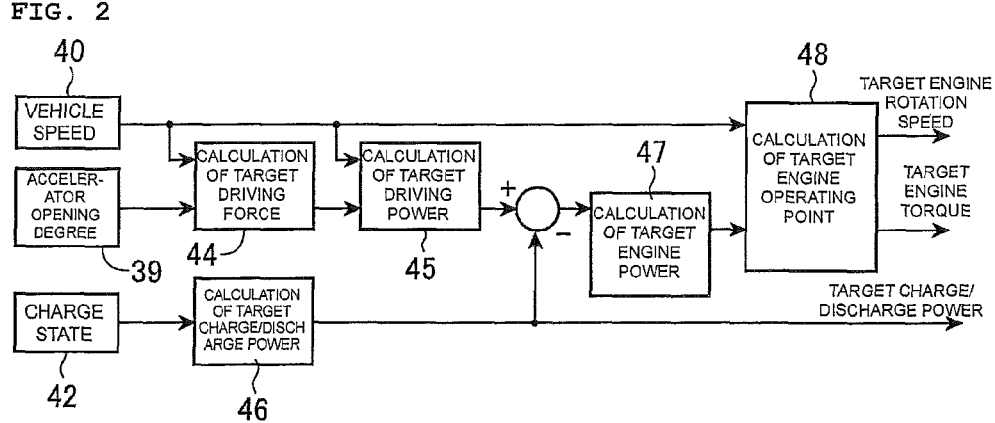
FIG. 2 is a control block diagram of a target engine operating point.
Figure 8:
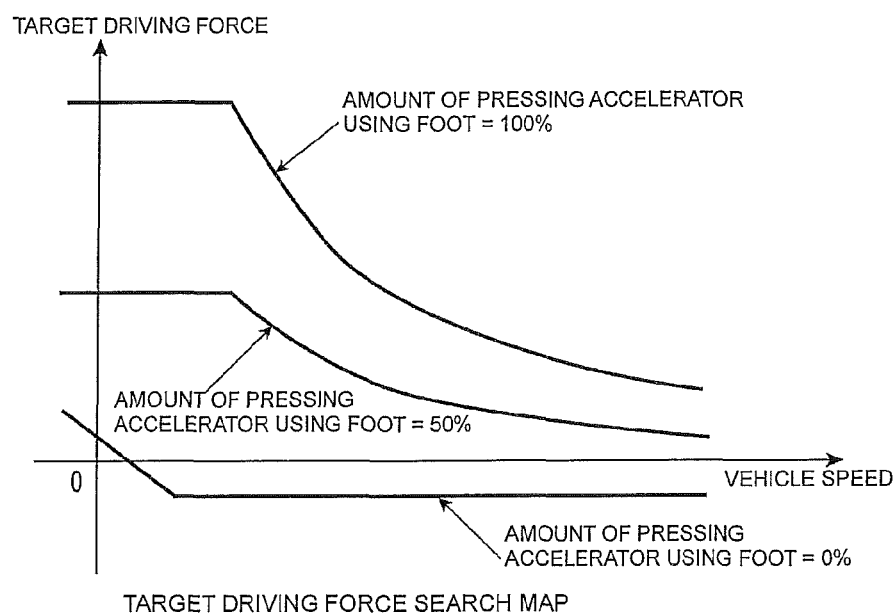
FIG. 8 is a target driving force search map according to a vehicle speed and the accelerator opening degree.

The target driving force setting means 44, as illustrated in FIG. 2, searches a target driving force search map illustrated in FIG. 8 for the target driving force used for driving the hybrid vehicle in accordance with the accelerator opening degree detected by the accelerator opening degree detecting means 39 and the vehicle speed detected by the vehicle speed detecting means 40 and determines the target driving force. The target driving force is set to a negative value so as to be a driving force in a deceleration direction corresponding to engine brake in a high vehicle speed region at the accelerator opening degree=0 and is set to a positive value for creep driving in a low vehicle speed region.

The target driving power setting means 45 sets the target driving power based on the accelerator opening degree detected by the accelerator opening degree detecting means 39 and the vehicle speed detected by the vehicle speed detecting means 40. In this embodiment, as illustrated in FIG. 2, the target driving power required for driving the hybrid vehicle at the target driving force is set by multiplying the target driving force set by the target driving force setting means 44 by the vehicle speed detected by the vehicle speed detecting means 40.

The target charge/discharge power setting means 46 sets the target charge/discharge power based on at least the charge state SOC of the battery 20 that is detected by the battery charge state detecting means 42. In this embodiment, the target charge/discharge power is searched from a target charge/discharge power search table illustrated in FIG. 9 in accordance with the charge state SOC of the battery 20 and the target charge/discharge power is set.

The target engine power calculating means 47, as illustrated in FIG. 2, calculates the target engine power based on the target driving power set by the target driving power setting means 45 and the target charge/discharge power set by the target charge/discharge power setting means 46. In this embodiment, by subtracting the target charge/discharge power from the target driving power, the target engine power is acquired.

The target engine operating point setting means 48 sets a target engine operating point (a target engine rotation speed and target engine torque) based on the target engine power and the efficiency of the whole system of the control device 1. In this embodiment, the target engine operating point is searched from a target engine operating point search map illustrated in FIG. 10 in consideration of the vehicle speed.

The motor torque instruction value calculating means 49 calculates the torque instruction values of the first and second motor generators 4 and 5.

Figure 3:
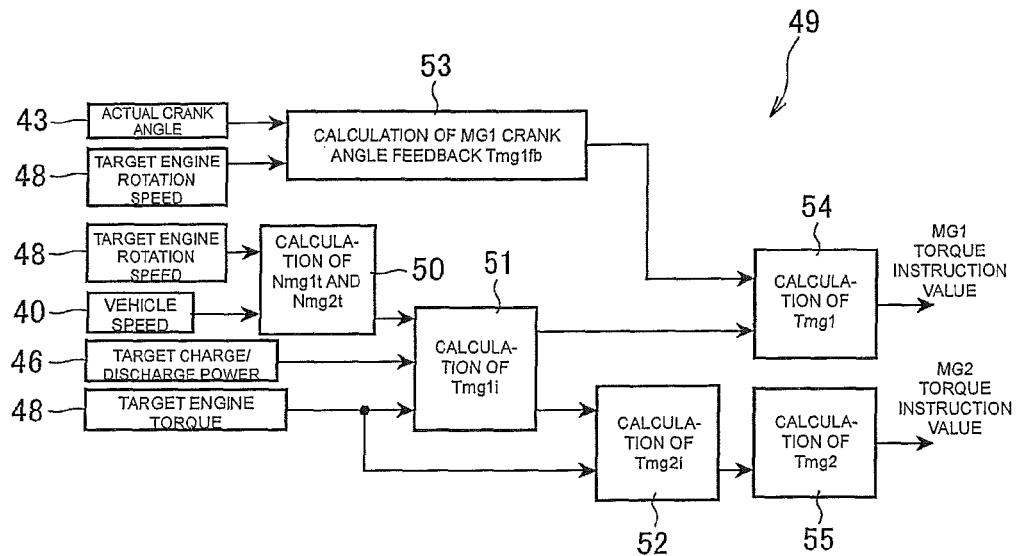
FIG. 3 is a control block diagram of calculating a torque instruction value of a motor generator.

The torque instruction value of the first motor generator 4 and the torque instruction value of the second motor generator 5 set by the motor torque instruction value calculating means 49, as illustrated in FIG. 3, are calculated by first to sixth calculation units 50 to 55. In FIG. 3, MG1 represents the first motor generator 4, and MG2 represents the second motor generator 5.

The first calculation unit 50 calculates a target rotation speed Nmg1t of the first motor generator 4 and a target rotation speed Nmg2t of the second motor generator 5 in a case where the engine rotation speed is the target engine rotation speed based on the target engine rotation speed set by the target engine operating point setting means 48 and the vehicle speed detected by the vehicle speed detecting means 40.

The second calculation unit 51 calculates the basic torque Tmg1i of the first motor generator 4 based on the target rotation speed Nmg1t of the first motor generator 4 and the target rotation speed Nmg2t of the second motor generator 5, which are calculated by the first calculation unit 50, the target charge/discharge power set by the target charge/discharge power setting means 46, and the target engine torque set by the target engine operating point setting means 48.

The third calculation unit 52 calculates the basic torque Tmg2i of the second motor generator 5 based on the basic torque Tmg1i of the first motor generator 4 that is calculated by the second calculation unit 51 and the target engine torque set by the target engine operating point setting means 48.

The fourth calculation unit 53 calculates the crank angle feedback torque Tmg1fb of the first motor generator 4 based on the target engine rotation speed set by the target engine operating point setting means 48 and the actual crank angle detected by the crank angle detecting means 43.

The fifth calculation unit 54 calculates a torque instruction value Tmg1 of the first motor generator 4 based on the basic torque Tmg1i of the first motor generator 4 that is calculated by the second calculation unit 51 and the crank angle feedback torque Tmg1fb of the first motor generator 4 calculated by the fourth calculation unit 53.

The sixth calculation unit 55 calculates a torque instruction value Tmg2 of the second motor generator 5 based on the basic torque Tmg2i of the second motor generator 5 that is calculated by the third calculation unit 52.

The control device 1 of the hybrid vehicle performs control of the drive states of the air content adjusting means 9, the fuel supplying means 10, and the ignition means 11 such that the engine 2 operates at the target engine operating point (the target engine rotation speed and the target engine torque) set by the target engine operating point setting means 48 by using the control unit 38. In addition, the control unit 38 performs control of the drive states of the first and second motor generators 4 and 5 using the torque instruction values set by the motor torque instruction value calculating means 49 such that the engine rotation speed of the engine 2 is the target engine rotation speed set by the target engine operating point setting means 48.

When the engine rotation speed is a predetermined rotation speed or less, the control device 1 of the hybrid vehicle starts the crank angle stopping control. The control device 1 uses the target engine rotation speed reduction rate calculated in the previous crank angle stopping control (in a case where there is no such a target engine rotation speed reduction rate, a predetermined value is used) and predicts a crank angle stop position based on the engine rotation speed and the target engine rotation speed reduction rate.

Then, the control device 1 is configured to calculate a total amount of movement of the crank angle for stopping at the target stop position, to acquire a reduction rate of the target engine rotation speed for which the crank angle is moved by the total amount of movement and the engine is accurately stopped, to calculate a target crank angle backwards based on the target engine rotation speed and the reduction rate, to search a table based on a deviation between the actual crank angle and the target crank angle, and to determine the crank angle feedback torque of the first motor generator 4.

The content of the control according to the present invention will be described with reference to control flowcharts illustrated in FIGS. 4 to 7.

Figure 4:
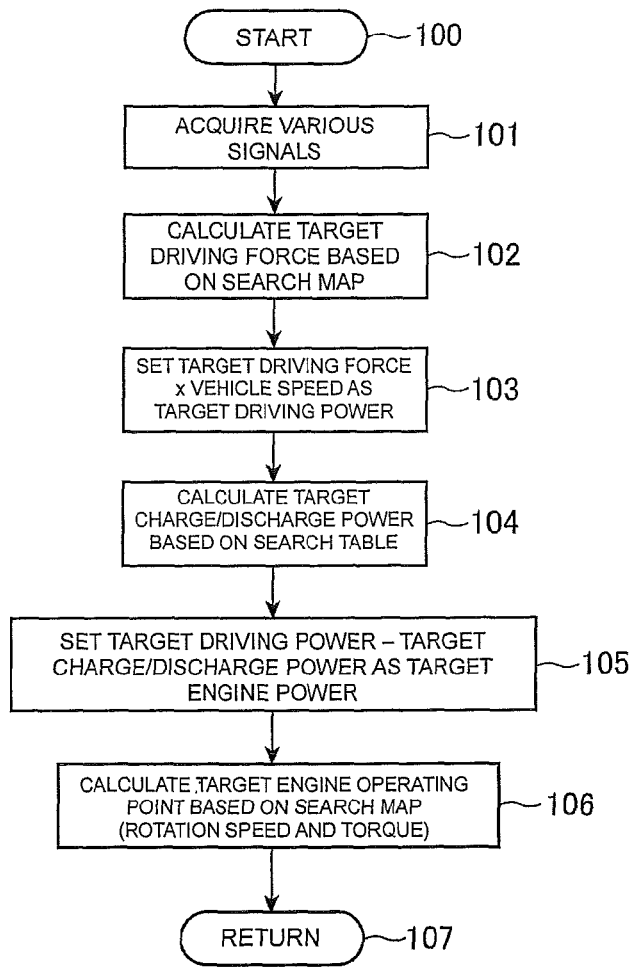
FIG. 4 is a control flowchart of calculating a target engine operating point.
Figure 5:
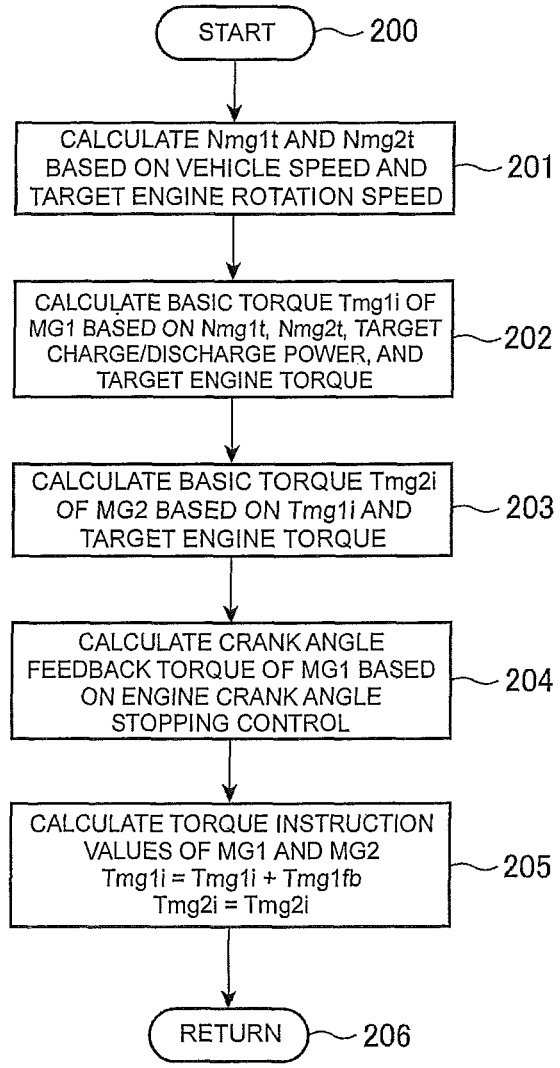
FIG. 5 is a control flowchart of calculating a torque instruction value of a motor generator.

In the control flowchart of FIG. 4, a target engine operating point (a target engine rotation speed and target engine torque) is calculated based on the amount of driver's operation of the accelerator pedal (accelerator opening degree) and the vehicle speed of the hybrid vehicle. In the flowchart of FIG. 5, the basic torques of the first and second motor generators 4 and 5 are calculated based on the target engine operating point, the crank angle feedback torque of the first motor generator 4 is added to the basic torque of the first motor generator 4, and the torque instruction values of the first and second motor generators 4 and 5 are calculated.

Figure 6:
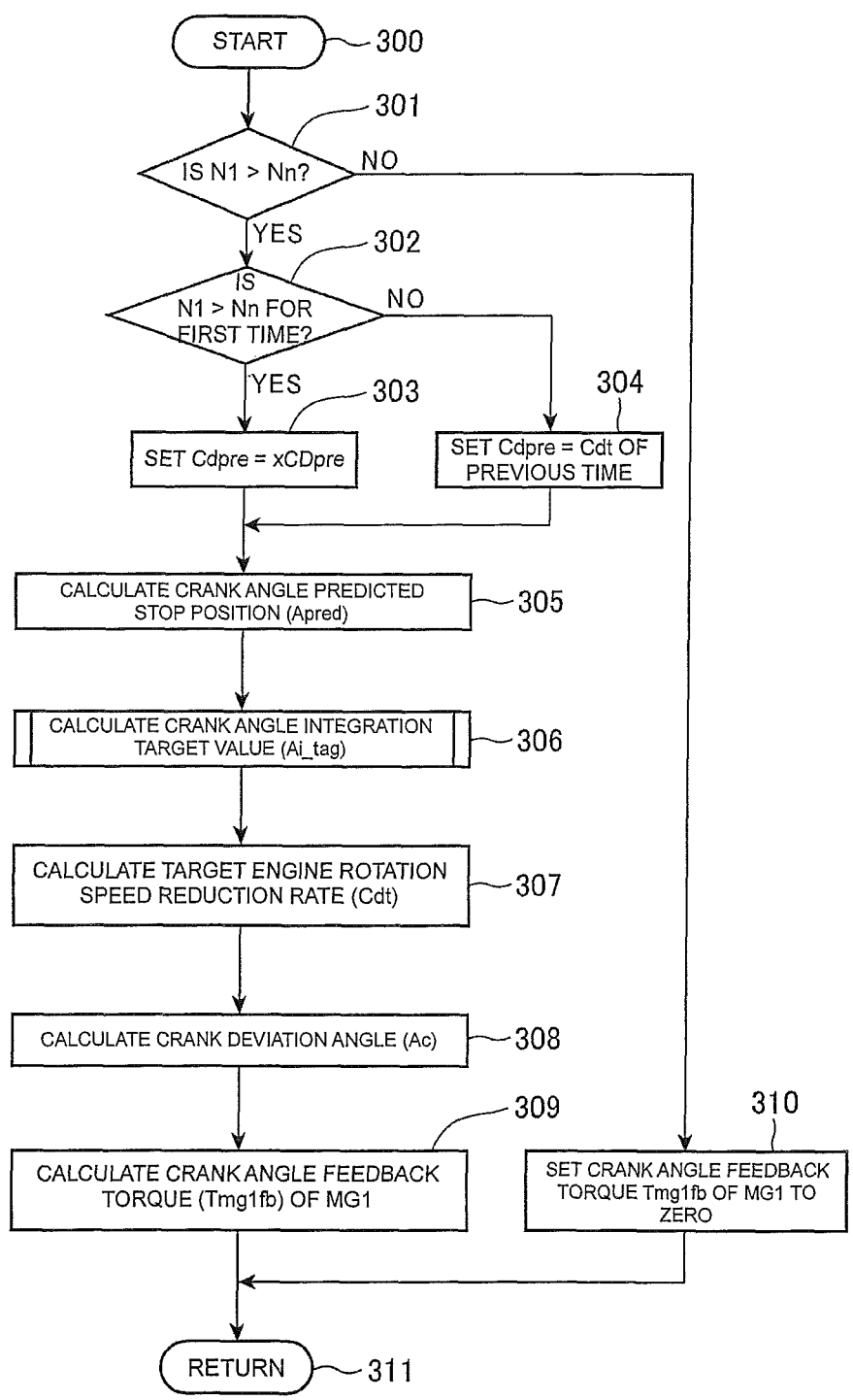
FIG. 6 is a control flowchart of calculating crank angle feedback torque of a first motor generator.
Figure 12:
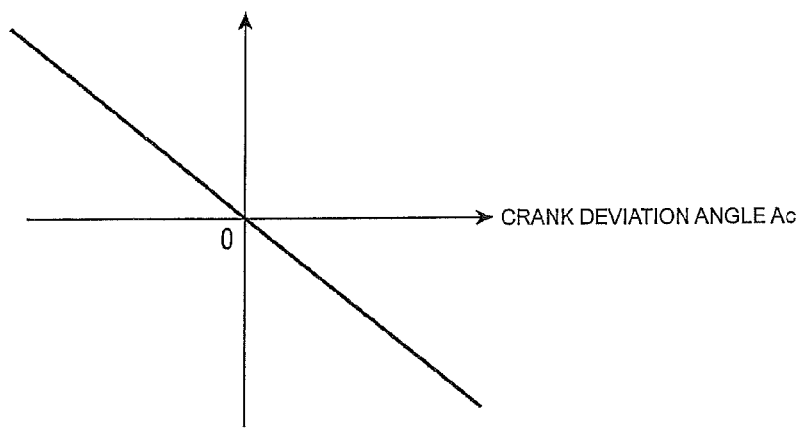
FIG. 12 is a crank angle feedback torque search table of the first motor generator.

In addition, in the control flowchart of FIG. 6, a crank angle integration target value is calculated so as to calculate a target crank angle, and the crank angle feedback torque search table illustrated in FIG. 12 is searched for the crank angle feedback torque of the first motor generator 4 based on a deviation between the actual crank angle and the target crank angle. In the control flowchart of FIG. 7, a subroutine for calculating a crank angle integration target value in Step 306 illustrated in FIG. 6 is performed. In addition, the flowcharts illustrated in FIGS. 4 to 7 are performed every control cycle. In FIGS. 4 to 7, MG1 represents the first motor generator 4, and MG2 represents the second motor generator 5.

The calculation for determining a target engine operating point by calculating the target driving power and the target charge/discharge power based on various signals will be described with reference to the flowchart illustrated in FIG. 4.

As illustrated in FIG. 4, in the calculation of the target engine operating point, when the control program starts (100), in Step 101, various signals of the accelerator opening degree detected by the accelerator opening degree detecting means 39, the vehicle speed detected by the vehicle speed detecting means 40, the engine rotation speed detected by the engine rotation speed detecting means 41, the charge state SOC of the battery 20 detected by the battery charge state detecting means 42, and an actual crank angle detected by the crank angle detecting means 43 are acquired.

In Step 102, a target driving force according to the vehicle speed and the accelerator opening degree is calculated based on a target driving force detection map illustrated in FIG. 8. The target driving force is set to a negative value so as to be a driving force in a deceleration direction corresponding to engine brake in a high vehicle speed region at the accelerator opening degree=0 and is set to a positive value for creep driving in a low vehicle speed region.

Figure 9:
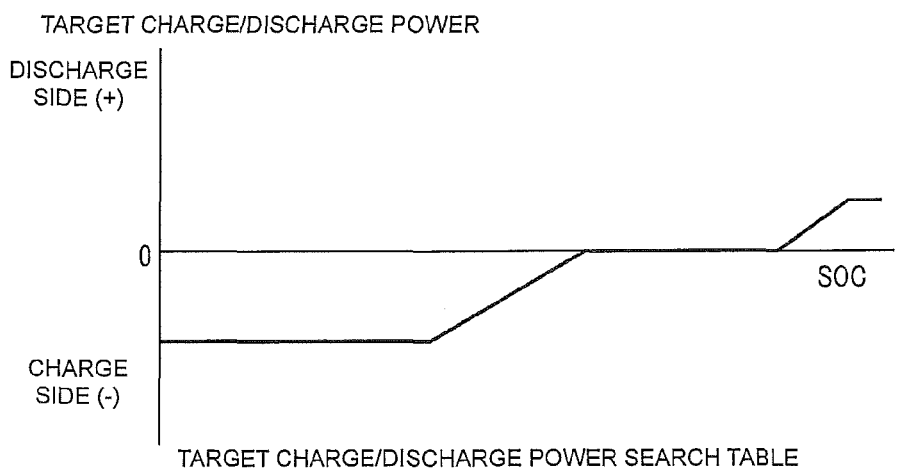
FIG. 9 is a target charge/discharge power search table according to the charge state of a battery.

Next, the target driving power required for driving the hybrid vehicle with the target driving force is calculated by multiplying the target driving force calculated in Step 102 by the vehicle speed (103) and the target charge/discharge power is calculated based on the target charge/discharge power search table (104) illustrated in FIG. 9.

In Step 104, in order to control the charge state SOC of the battery 20 in a normal use range, the target charge/discharge power is calculated based on the target charge/discharge power search table illustrated in FIG. 9. In a case where the charge state SOC of the battery 20 is low, the target charge/discharge power is increased on the charge side so as to prevent excessive discharge of the battery 20. In a case where the charge state SOC of the battery 20 is high, the target charge/discharge power is increased on the discharge side so as to prevent an excessive charge. With the target charge/discharge power, for the convenience of description, the discharge side is set as a positive value and the charge side is set as a negative value.

In Step 105, the target engine power to be output by the engine 2 is calculated based on the target driving power and the target charge/discharge power. The power to be output by the engine 2 has a value acquired by adding (subtracting in the case of discharge) the power required for charging the battery 20 to the power required for driving the hybrid vehicle. Here, since the charge side is handled as a negative value, the target engine power is calculated by subtracting the target charge/discharge power from the target driving power.

Figure 10:
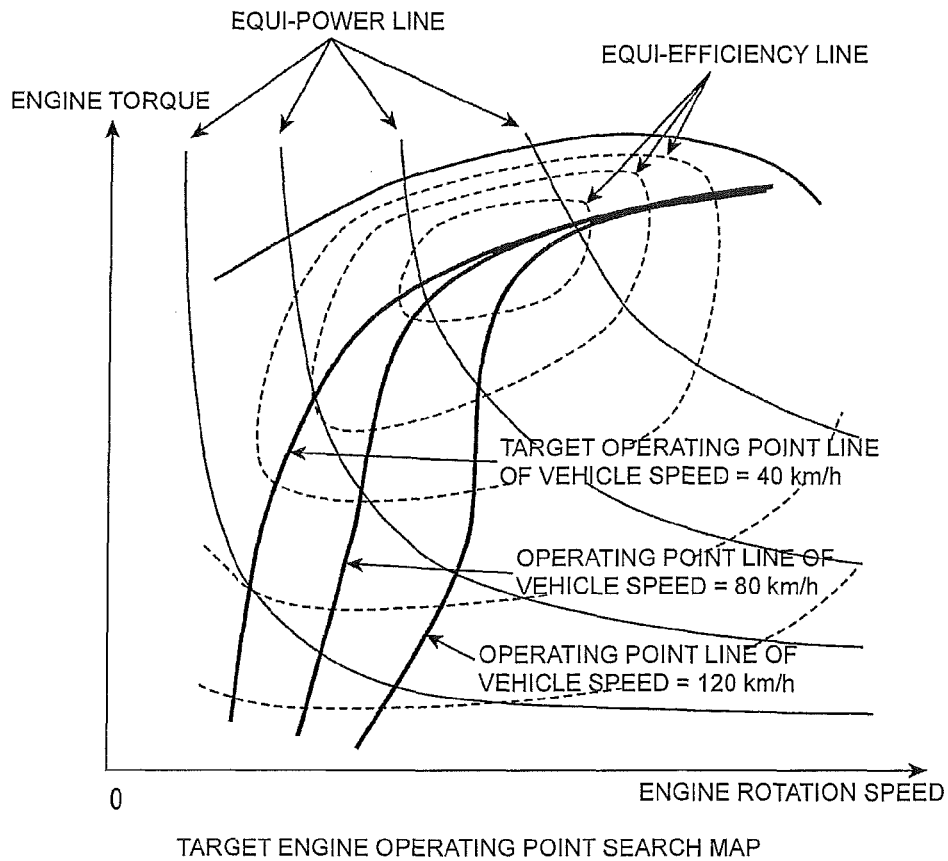
FIG. 10 is a target engine operating point search map formed by engine torque and an engine rotation speed.

In Step 106, a target engine operating point (the target engine rotation speed and the target engine torque) corresponding to the target engine power and the vehicle speed is calculated based on the target engine operating point search map illustrated in FIG. 10, and the process is returned (107).

The target engine operating point search map (FIG. 10) selects points at which the total efficiency acquired by adding the efficiency of the power transmission system configured by the differential gear mechanism 8 and the first and second motor generators 4 and 5 to the efficiency of the engine 2 on the equi-power line for each power level and sets a line acquired by joining the points as a target engine operating line. Each target engine operating line is set for each vehicle speed (40 km/h, 80 km/h, and 120 km/h in FIG. 10).

The set value of the target engine operating line may be acquired through an experiment or may be acquired through a calculation that is based on the efficiency of the engine 2 and the first and second motor generators 4 and 5. In addition, the target engine operating line is set to move to the high rotation side as the vehicle speed increases when the target engine power is the same.

Next, the calculation of the target torque of the first motor generator 4 and the target torque of the second motor generator 5 used for setting the amount of charge/discharge of the battery 20 as a target value while the target driving force is output will be described along the control flowchart of calculating the motor torque instruction values illustrated in FIG. 5. In FIG. 5, MG1 represents the first motor generator 4, and MG2 represents the second motor generator 5.

In the calculation of the motor torque instruction values illustrated in FIG. 5, when a control program starts (200), in Step 201, the driving shaft rotation speed No of the driving shaft 7 to which the first and second planetary gear mechanisms 21 and 22 are connected is calculated based on the vehicle speed. Next, the target rotation speed $Nmg1t$ of the first motor generator 4 and the target rotation speed $Nmg2t$ of the second motor generator 5 in a case where the engine rotation speed Ne is the target engine rotation speed Net are calculated by using the following Equations (1) and (2).

These Equations (1) and (2) for the calculation are acquired based on the relation between the rotation speeds of the first and second planetary gear mechanisms 21 and 22.

$$Nmg1t=(Net-No)*k1+Net \quad \text{Equation (1)}$$

$$Nmg2t=(No-Net)*k2+No \quad \text{Equation (2)}$$

Here, k1 and k2, as described above, are values that are determined based on the gear ratio between the first and second planetary gear mechanisms 21 and 22.

Next, in Step 202, the basic torque $Tmg1i$ of the first motor generator 4 is calculated by using the following Equation (3) based on the target rotation speed $Nmg1t$ of the first motor generator 4 and the target rotation speed $Nmg2t$ of the second motor generator 5, which have been acquired in Step 201, and the target charge/discharge power Pbatt and the target engine torque Tet.

$$Tmg1i=(Pbatt*60/2\pi-Nmg2t*Tet/k2)/(Nmg1t+Nmg2t*(1+k1)/k2) \quad \text{Equation (3)}$$

This Equation (3) for the calculation can be derived by solving certain simultaneous equations from a torque balance equation (4) representing the balance of torques input to the first and second planetary gear mechanisms 21 and 22 and an electric power balance equation (5) representing that the electric power generated or consumed by the first and second motor generators 4 and 5 and the input/output electric power (Pbatt) for the battery 20 are the same.

$$Te+(1+k1)*Tmg1=k2*Tmg2 \quad \text{Equation (4)}$$

$$Nmg1*Tmg1*2\pi/60+Nmg2*Tmg2*2\pi/60=Pbatt \quad \text{Equation (5)}$$

Next, in Step 203, the basic torque $Tmg2i$ of the second motor generator 5 is calculated by using the following Equation (6) based on the basic torque $Tmg1i$ of the first motor generator 4 and the target engine torque Tet.

$$Tmg2i=(Tet+(1+k1)*Tmg1i)/k2 \quad \text{Equation (6)}$$

This equation is derived from Equation (4) described above.

Next, in Step 204, the crank angle feedback torque $Tmg1fb$ of the first motor generator 4 is calculated based on the crank angle stopping control. This is the feedback torque that is output so as to stop the crank angle of the crankshaft of the engine 2 at the target stop position in the crank angle stopping control to be described later.

In Step 205, a torque instruction value Tmg1 of the first motor generator 4 is calculated by adding the crank angle feedback torque $Tmg1fb$ of the first motor generator 4 to the basic torque $Tmg1i$ of the first motor generator 4, a torque instruction value Tmg2 of the second motor generator 5 is calculated based on the basic torque $Tmg2i$ of the second motor generator 5, and the process is returned (206).

The control unit 38 controls the first and second motor generators 4 and 5 in accordance with the torque instruction values Tmg1 and Tmg2, whereby the amount of charging/discharging of the battery 20 can be the target value while a target driving force is output. In addition, the control unit 38 performs control such that the crank angle of the crankshaft of the engine 2 is stopped at the target stop position.

Next, the calculation of the crank angle feedback torque of the first motor generator 4 for stopping the crank angle of the engine 2 at the target stop position will be described along the control flowchart illustrated in FIG. 6. This control flowchart is performed every control cycle until the engine 2 stops.

When the control program starts (300), in Step 301, it is determined whether or not the target engine rotation speed Nn is lower than a crank angle stopping control starting rotation speed N1 (301). In a case where Nn is lower than N1 (Yes in Step 301), the process proceeds to Step 302. On the other hand, in a case where Nn is higher than N1 (No in Step 301), the process proceeds to Step 310, zero is input to the crank angle feedback torque $Tmg1fb$ of the first motor generator 4, and the crank angle stopping control ends.

In Step 302, it is determined whether or not the formation of the determination of "Yes" in Step 301 is a formation made for the first time (first formation). The formation of the first time described here represents first formation "until the engine 2 stops after the "crank angle stopping control is performed". In the case of the first formation (Yes in Step 302), the process proceeds to Step 303, and the previous value of the target engine rotation speed reduction rate Cdpre is substituted with a predetermined reduction rate xCDpre. On the other hand, in the case of no first formation (No in Step 302), the process proceeds to Step 304, and the previous value of the target engine rotation speed reduction rate Cdpre is substituted with the target engine rotation speed reduction rate Cdt calculated in the previous control process.

The predetermined reduction rate xCDpre may be an arbitrary reduction rate and is preferably between an upper limit value Cd1$u$ and a lower limit value Cd1$l$ of the reduction rate or between an upper limit value Cd2$u$ and a lower limit value Cd2$l$ of the reduction rate, which will be described later.

In Step 305, a crank angle predicted stop position Apred is calculated based on the previous value of the target engine rotation speed reduction rate Cdpre, the target engine rotation speed Nn, the actual crank angle An, a response delay time Tdelay, and the engine target rotation speed reduction rate-converted rotation speed N2. The response delay time Tdelay is a response delay time until a torque instruction is reflected on the engine rotation speed after the torque instruction of the first motor generator 4 is output.

Figure 11:
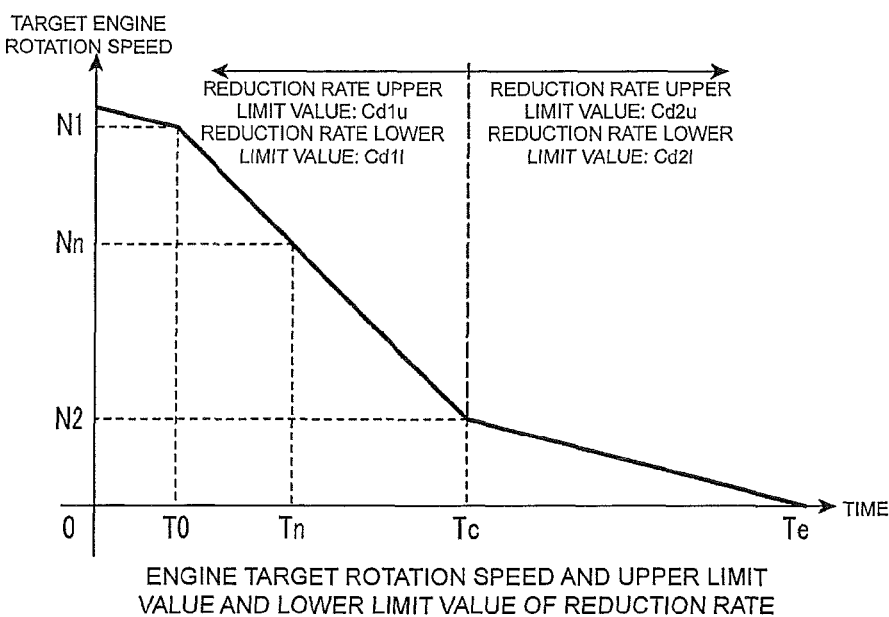
FIG. 11 is a diagram that illustrates an engine target rotation speed and an upper limit value and a lower limit value of the reduction rate.

FIG. 11 illustrates a trend of the target engine rotation speed during the engine stopping process. In FIG. 11, T0 is an engine stopping process start time, Tc is time when Nn (target engine rotation speed)=N2 (engine target rotation speed reduction rate-converted rotation speed), and Te is a time when the engine 2 stops and the crank angle stopping process ends. In addition, there is a limitation on the target engine rotation speed reduction rate Cdt. The target engine rotation speed reduction rate Cdt is limited by the upper limit value Cd1$u$ and the lower limit value Cd1$l$ of the reduction rate in a case where Nn>N2 and is limited by the upper limit value Cd2$u$ and the lower limit value Cd2$l$ of the reduction rate in a case where Nn≤N2.

In the calculation of the crank angle predicted stop position Apred, the cases are classified into a case where Nn>N2 and a case where Nn≤N2.

In the case where Nn>N2, the crank angle predicted stop position Apred is calculated as below.

Math. 1

(here, $nc=(Nn-N2)/Cdpre$, and $ne=N2/CDpre$)  Equation (7)

On the other hand, in the case where N2≥Nn, the crank angle predicted stop position Apred is calculated as below.

Math. 2

(here, $ne=Nn/Cdpre$)  Equation (8)

In Equations (7) and (8), ut is a control cycle in which the crank angle stopping control is performed.

In Step 306, a crank angle integration target value Ai_tag is calculated based on the crank angle predicted stop position Apred and the target stop position Atag.

In Step 307, a target engine rotation speed reduction rate Cdt is calculated based on the crank angle integration target value Ai_tag, the actual crank angle An, the response delay time Tdelay, and the target engine rotation speed Nn.

The crank angle integration target value Ai_tag can be represented by using the target engine rotation speed reduction rate Cdt as below.

Math. 3

(here, $nt=Nn/Cdt$)  Equation (9)

By transforming this equation, the target engine rotation speed reduction rate Cdt can be calculated as below.

Math. 4

Equation (10)

The target engine rotation speed reduction rate Cdt can be calculated as above.

In Step 308, a crank deviation angle Ac is calculated based on the crank angle integration target value Ai_tag and the actual crank angle An. A target crank angle At for stopping at the target stop position Atag can be calculated as below.

In a case where Nn>N2, the crank angle can be calculated by using the following equation.

Math. 5

(here, $nt1=(Nn-N2)/Cdt$, and $nt2=N2/Cdt$)  Equation (11)

On the other hand, in a case where Nn≤N2, the crank angle can be calculated by using the following equation.

Math. 6

(here, $nt=Nn/Cdt$)  Equation (12)

Then, the crank deviation angle Ac is calculated using the following equation.

$$Ac=An-At$$  Equation (13)

In Step 309, a crank angle feedback torque search table as illustrated in FIG. 12 is searched, a crank angle feedback torque Tmg1$fb$ of the first motor generator 4 is calculated based on the crank deviation angle Ac, and the process is returned (311).

The crank angle feedback torque Tmg1$fb$ of the first motor generator 4, as illustrated in Step 205 represented in FIG. 5, is added to the basic torque Tmg1$i$, whereby a torque instruction value Tmg1 of the first motor generator 4 is calculated.

Figure 7:
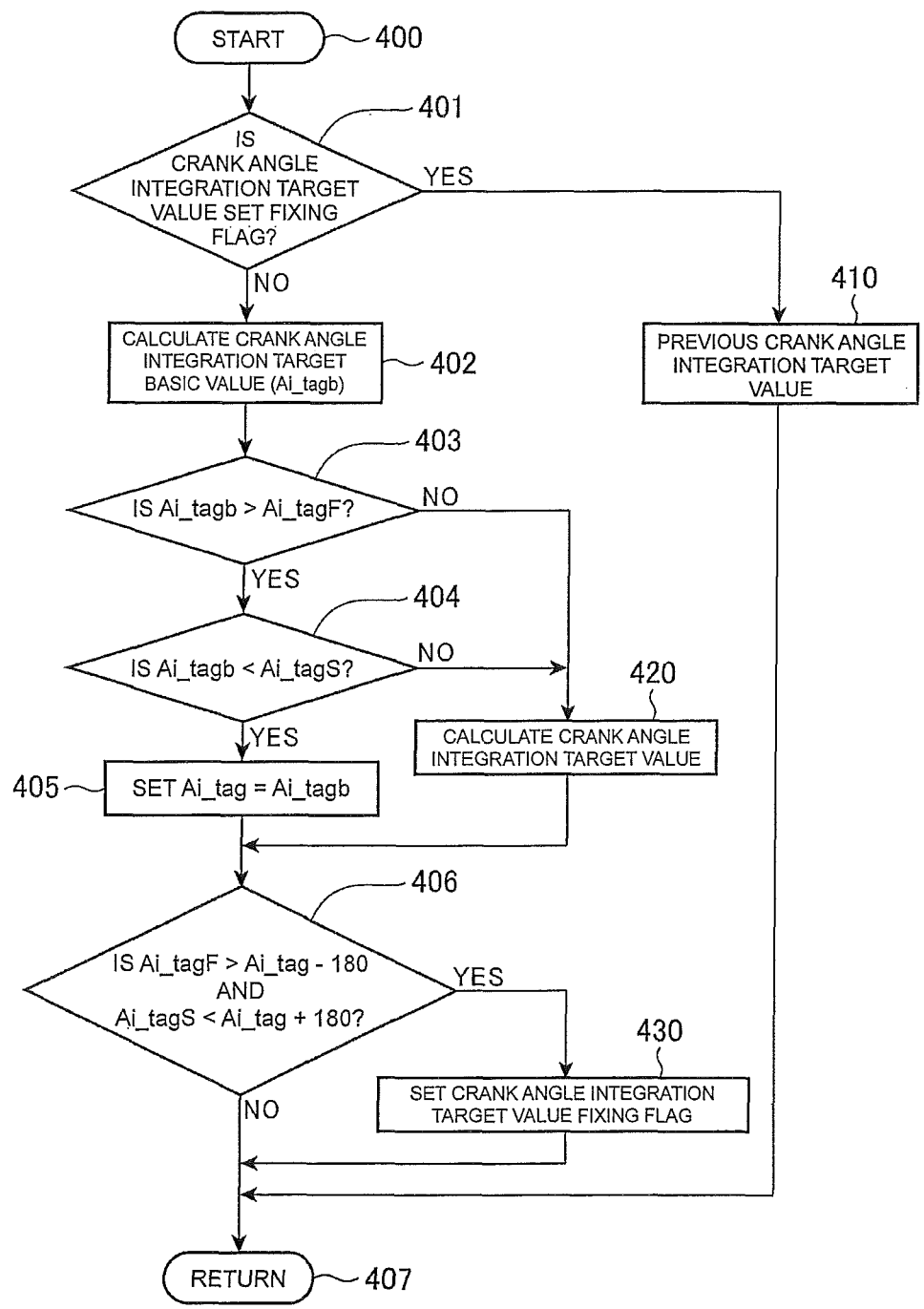
FIG. 7 is a control flowchart of calculating a crank angle integration target value.

Next, the calculation of the crank angle integration target value, which is performed in Step 306 illustrated in FIG. 6, will be described along the control flowchart of FIG. 7.

When the control program starts (400), in Step 401, it is determined whether or not a crank angle integration target value fixing flag to be described later in Step 430 is set. When the crank angle integration target value fixing flag is set (Yes in Step 401), the process proceeds to Step 410, and the previous crank angle integration target value is set as a current crank angle integration target value, and the process ends. On the other hand, when the crank angle integration target value fixing flag is not set (No in Step 401), the process proceeds to Step 402.

In Step 402, a crank angle integration target basic value Ai_tagb is calculated. Here, m satisfying the following equation is searched for based on the crank angle predicted stop position Apred calculated in Step 305 illustrated in FIG. 6 and the target crank angle stop position Atag.

$$-Aarea+Atag+180 \times m \leq Apred \leq -Aarea+Atag+180 \times (m+1)$$  Equation (14)

Then, the crank angle integration target basic value Ai_tagb is calculated using the following equation.

$$Ai\_tagb=Atag+180 \times m$$  Equation (15)

In this embodiment, since an interval at which a stop position equivalent to the target crank angle stop position appears is 180 degrees, the term of "180×m" is added. In addition, Aarea is a crank angle integration target value offset. Equation (16) represented below is acquired by eliminating the crank angle integration target value offset Aarea from Equation (14). When the crank angle integration target basic value Ai_tagb is acquired by searching for m using Equation (16), as in (1) illustrated in FIG. 13, a range of Atag+180m to Atag+180(m+1) is the range to be determined as Ai_tagb=Atag+180m. Accordingly, crank angle stopping control is performed in which a target stop position that is located before the predicted stop position is set all the time, and the engine rotation speed is reduced early.

Figure 13:
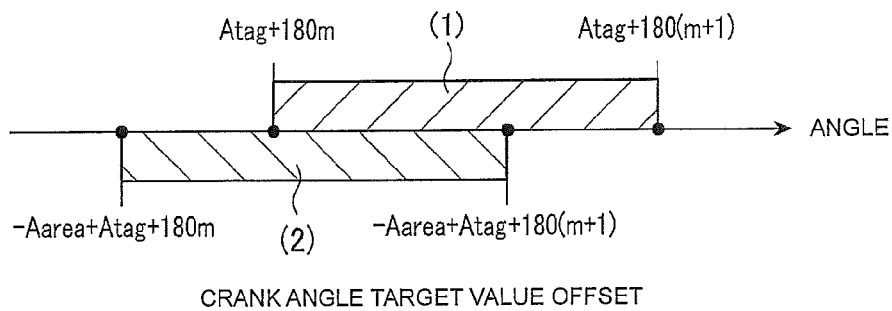
FIG. 13 is a diagram that illustrates a crank angle object value offset.

Here, an element of the crank angle integration target value offset Aarea is added, and the result acquired by searching for m is illustrated in (2) represented in FIG. 13. In this case, a range near Atag+180m (from (−Aarea+Atag+180m to −Aarea+Atag+180(m+1)) becomes the range in which Ai_tagb=Atag+180m, and accordingly, a target stop position is not set before (or after) the predicted stop position all the time.

$$A\text{tag}+180 \times m \leq A\text{pred} \leq A\text{tag}+180(m+1) \qquad \text{Equation (16)}$$

In Step 403, a crank angle integration lower limit value Ai_tagF is calculated and is compared with the crank angle integration target basic value Ai_tagb. The crank angle integration lower limit value Ai_tagF is calculated as below using upper limit values Cd1$u$ and Cd2$u$ of the target engine rotation speed reduction rate represented in FIG. 11.

In a case where Nn>N2, the following equation is used.

Math. 7

$$(\text{here}, nf1=(Nn-N2)/Cd1u, \text{ and } nf2=N2/Cd2u) \qquad \text{Equation (17)}$$

On the other hand, in a case where Nn≤N2, the following equation is used.

Math. 8

$$(\text{here}, nf=Nn/Cd2u) \qquad \text{Equation (18)}$$

The crank angle integration lower limit value Ai_tagF is calculated as above.

In a case where Ai_tagb>Ai_tagF (Yes in Step 403), the process proceeds to Step 404. On the other hand, in a case where Ai_tagb≤Ai_tagF (No in Step 403), it is determined that the crank angle integration target value is not reached unless the engine 2 is stopped at a reduction rate exceeding the upper limit value of the target engine reduction rate in a speedy manner, the process proceeds to Step 420, and the crank angle integration target value is recalculated.

In Step 404, a crank angle integration upper limit value Ai_tagS is calculated and is compared with the crank angle integration target basic value Ai_tagb. The crank angle integration upper limit value Ai_tagS is calculated using lower limit values Cd1$l$ and Cd2$l$ of the target engine rotation speed reduction rate represented in FIG. 11.

In a case where Nn>N2, the following equation is used.

Math. 9

$$(\text{here}, ns1=(Nn-N2)/Cd1u, \text{ and } ns2=N2/Cd2u) \qquad \text{Equation (19)}$$

On the other hand, in a case where Nn≤N2, the following equation is used.

Math. 10

$$(\text{here}, ns=Nn/Cd2u) \qquad \text{Equation (20)}$$

The crank angle integration upper limit value Ai_tagS is calculated as above.

In a case where Ai_tagb<Ai_tagS (Yes in Step 404), Ai_tag is substituted with Ai_tagb (405), and the process proceeds to Step 406. On the other hand, in a case where Ai_tagb≤Ai_tagS (No in Step 404), it is determined that the crank angle integration target value is not reached unless the engine 2 is slowly stopped at a reduction rate below the lower limit value of the target engine rotation speed reduction rate, the process proceeds to Step 420, and the crank angle integration target value is recalculated.

In Step 420, the crank angle integration target basic value Ai_tagb is calculated using Equation (21) in a case where Ai_tagb≤Ai_tagF and is calculated using Equation (22) in a case where Ai_tagb≥Ai_tagS.

$$Ai\_\text{tag}=Ai\_\text{tag}b+180 \qquad \text{Equation (21)}$$

$$Ai\_\text{tag}=Ai\_\text{tag}b-180 \qquad \text{Equation (22)}$$

Accordingly, the crankshaft of the engine 2 is prevented from being stopped at a reduction rate above the upper limit value of the target engine rotation speed reduction rate or below the lower limit value of the target engine rotation speed reduction rate.

In Step 406, it is determined whether the crank angle integration target value is fixed. In a case where "Ai_tagF>Ai_tag−180" and "Ai_tagS<Ai_tag+180" is satisfied (Yes in Step 406), it is determined that control is performed with a reduction rate that is above the upper limit value of the target engine reduction rate or below the lower limit value of the target engine reduction rate when the crank angle integration target value is changed by 180 degrees, the process proceeds to Step 430, and the crank angle integration target value fixing flag is set.

This flag is maintained "until the engine stops after the flag is set". On the other hand, in a case where "Ai_tagF>Ai_tag−180" and "Ai_tagS<Ai_tag+180" is not satisfied (No in Step 406), the process is returned (407).

Figure 14:
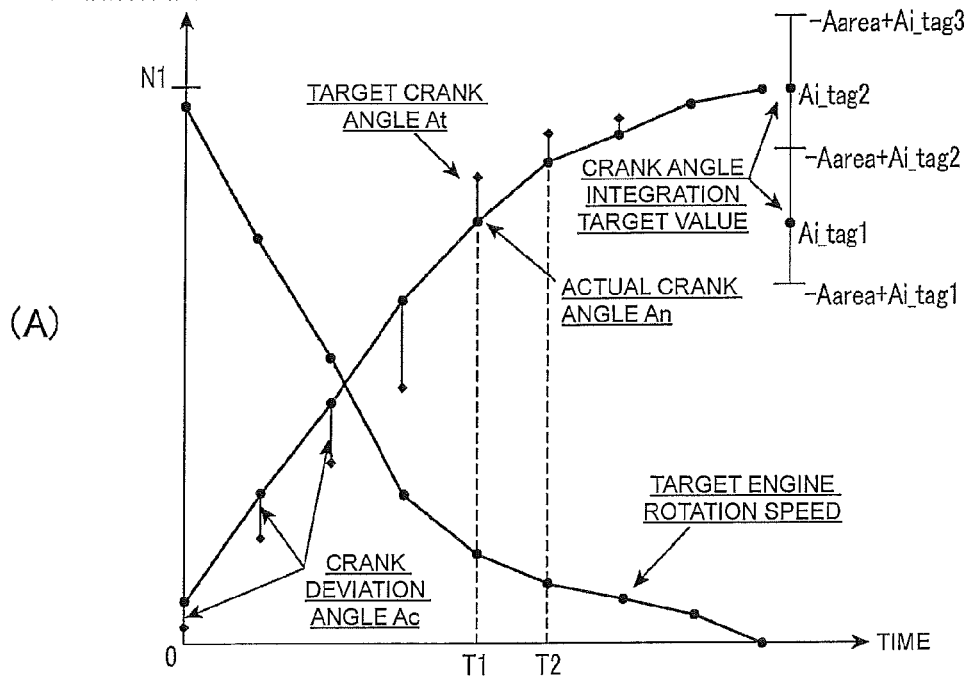
FIG. 14(A) is a time chart of the engine rotation speed in a case where the crank angle integration target value is changed.
FIG. 14(B) is a time chart of the crank angle feedback torque of the first motor generator in a case where the crank angle integration target value is changed.
Figure 14:
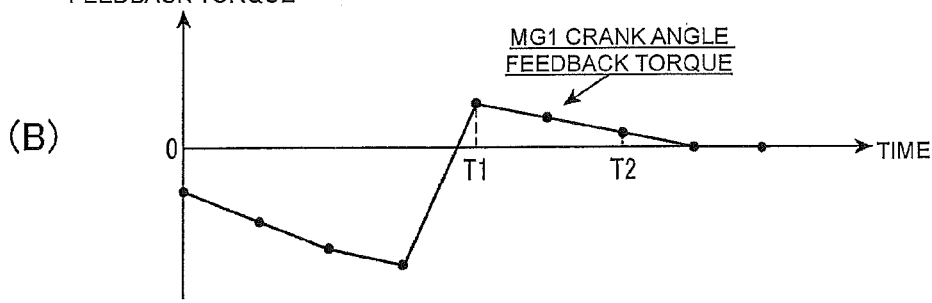

FIG. 14 illustrates a time chart of this embodiment.

FIG. 14 is a time chart in a case where the crank angle integration target value is changed until the crank angle stopping process stops after being started. In FIG. 14(A), Ai_tag1, Ai_tag2, and Ai_tag3 are crank angle integration target values, Ai_tag2 is acquired by adding 180 degrees to Ai_tag1, and Ai_tag3 is acquired by adding 180 degrees to Ai_tag2.

When the target engine rotation speed Nn is below the crank angle stopping control starting rotation speed N1 at time 0, the control device 1 starts the crank angle stopping control and calculates a crank angle predicted position Apred along the flowchart illustrated in FIG. 6. Since the crank angle predicted position Apred is between −Aarea+Ai_tag1 and −Aarea+Ai_tag2, the crank angle integration target value is set as Ai_tag1. The crank angle feedback torque Tmg1$fb$ of the first motor generator 4 is searched for based on the crank deviation angle Ac between the target crank angle, which is calculated based on the crank angle integration target value Ai_tag1, and the actual crank angle.

The control device 1 performs this process every control period and performs control such that the crank angle is stopped at the target stop position when the engine stops. Since "actual crank angle">"target crank angle" to be Ac>0 is satisfied from time 0 to time T1, as illustrated in FIG. 14(B), the crank angle feedback torque Tmg1$fb$ of the first motor generator 4 is output as a negative value.

When it is time T1, the crank angle predicted position Apred is more than −Aarea+Ai_tag2, and accordingly, the crank angle integration target value is reset to Ai_tag2. Then, crank angle feedback torque of the first motor generator 4 is searched for based on the deviation angle Ac between the target crank angle calculated based on the crank angle integration target value and the actual crank angle. Since the "actual crank angle"≤"target crank angle" to be Ac≤0 is satisfied until the engine stops from time T1, and accordingly, the crank angle feedback torque of the first motor generator 4 represents zero or a positive value.

When it is time T2, Ai_tagF and Ai_tagS calculated using Equations (17) to (20) satisfy "Ai_tagF>Ai_tag2−180 and Ai_tagS<Ai_tag+180", and accordingly, the crank angle integration target value fixing flag is set. Thereafter, the crank angle integration target value is fixed to Ai_tag2 until the engine 2 stops.

As above, in the control device 1 of the hybrid vehicle that controls driving of the vehicle using outputs of the engine 2 and the first and second motor generators 4 and 5, a process is periodically performed in which a crank angle predicted stop position is calculated based on a target engine rotation speed reduction rate that is calculated in advance, a crank angle integration target value is calculated based on the crank angle predicted stop position, the target engine rotation speed reduction rate is recalculated based on the crank angle integration target value and an actual crank angle, a target crank angle is calculated based on the crank angle integration target value and the target engine rotation speed reduction rate, a crank deviation angle is calculated based on the target crank angle and the actual crank angle, crank angle feedback torque of the motor is calculated based on the crank angle deviation angle, and a torque instruction value of the motor is calculated by adding the basic torque of the motor and the crank angle feedback torque when the engine 2 is stopped.

According to the control device 1 of the hybrid vehicle, the crank angle stopping control is periodically performed based on the target engine rotation speed reduction rate calculated in advance, and accordingly, the crankshaft of the engine can be stopped at the target crank angle stop position while a rapid change of the target engine rotation speed reduction rate is prevented.

In addition, according to the control device 1 of the hybrid vehicle, the crank angle feedback torques of the first and second motor generators 4 and 5 are calculated based on the crank deviation angle, and accordingly, the crank angle feedback torque can be applied such that the crankshaft of the engine 2 is stopped accurately at the target crank angle stop position even immediately before the engine is stopped.

In this control device 1 of the hybrid vehicle, in a case where the crank angle stopping control is predicted to be performed at a target engine rotation speed reduction rate that is above an upper limit value or below a lower limit value, which are set in advance, the crank angle integration target value is recalculated such that a target crank angle stop position is equivalent to the target crank angle stop position.

From this, according to this control device 1, by arranging the upper and lower limit values of the target engine rotation speed reduction rate, a rapid change of the target engine rotation speed during the crank angle stopping control can be prevented. As a result, rapid changes of the crank angle feedback torques of the first and second motor generators 4 and 5 are prevented, and accordingly, the output of torque, which is not intended by an operator, to the driving shaft 7 can be prevented.

In this control device 1 of the hybrid vehicle, the crank angle integration target value is fixed when a crank angle cannot reach a target crank angle stop position equivalent to the target crank angle stop position even when the crank angle stopping control is performed with an upper limit value or a lower limit value of the target engine rotation speed reduction rate that are set in advance.

From this, this control device 1 performs the crank stopping control until the engine is stopped while preventing the crank angle stopping control with a target engine rotation speed reduction rate that is above the upper limit value or below the lower limit value, whereby the crankshaft of the engine 2 can be stopped accurately at the target crank angle stop position.

In this control device 1 of the hybrid vehicle, the upper limit value and the lower limit value of the target engine rotation speed reduction rate are changed in accordance with the target engine rotation speed.

From this, the control device 1 can allow the engine 2 to pass through a rotation speed region, in which the engine 2 resonates, in a short time while performing the crank angle stopping control.

In this control device 1 of the hybrid vehicle, the crank angle predicted stop position, the crank angle integration target value, the target engine rotation speed reduction rate, and the target crank angle are calculated so as to include a crank angle change during a response delay up to the reflection of the torque instruction values of the first and second motor generators 4 and 5 on the engine rotation speeds from the calculation of the torque instruction values.

From this, this control device 1 can accurately predict the crank angle predicted stop position. As a result, the crankshaft of the engine 2 can be stopped accurately at the target crank angle stop position.

INDUSTRIAL APPLICABILITY

The present invention can perform control such that a crankshaft is stopped at a target crank angle at the time of stopping the engine and can be applied to crank angle stopping control at the time of stopping the engine without being applied only to a hybrid vehicle.

REFERENCE SIGNS LIST 1 control device of hybrid vehicle
2 engine
3 output shaft
4 first motor generator
5 second motor generator
7 driving shaft
8 differential gear mechanism
18 first inverter
19 second inverter
20 battery
21 first planetary gear mechanism
22 second planetary gear mechanism
31 one-way clutch
32 output unit
34 first rotating component
35 second rotating component
36 third rotating component
37 fourth rotating component
38 control unit
39 accelerator opening degree detecting means
40 vehicle speed detecting means
41 engine rotation speed detecting means
42 battery charge state detecting means
43 crank angle detecting means
44 target driving force setting means
45 target driving power setting means
46 target charge/discharge power setting means
47 target engine power calculating means
48 target engine operating point setting means
49 motor torque instruction value calculating means

The invention claimed is:
1. A control device of a hybrid vehicle that controls driving of a vehicle using outputs of an engine and a motor, the control device periodically performing a process in which:
a crank angle predicted stop position is calculated based on a target engine rotation speed reduction rate, the target engine rotation speed reduction rate being a rate for reducing a target engine rotation speed and is calculated in advance;

a crank angle integration target value is calculated based on the crank angle predicted stop position;

the target engine rotation speed reduction rate is recalculated based on the crank angle integration target value and an actual crank angle;

a target crank angle is calculated based on the crank angle integration target value and the target engine rotation speed reduction rate;

a crank deviation angle is calculated based on the target crank angle and the actual crank angle;

crank angle feedback torque of the motor is calculated based on the crank angle deviation angle; and a torque instruction value of the motor is calculated by adding basic torque of the motor and the crank angle feedback torque when the engine is stopped wherein when a crank angle stopping control is predicted to be performed with a target engine rotation speed reduction rate that is above an upper limit value or below a lower limit value, which are set in advance, the crank angle integration target value is recalculated such that a target crank angle stop position is equivalent to the target crank angle stop position.

2. The control device of the hybrid vehicle according to claim 1, wherein the crank angle integration target value is fixed when a target crank angle stop position equivalent to the target crank angle stop position cannot be reached even when the crank angle stopping control is performed with an upper limit value or a lower limit value of the target engine rotation speed reduction rate that are set in advance.

3. The control device of the hybrid vehicle according to claim 1, wherein the upper limit value and the lower limit value of the target engine rotation speed reduction rate are changed in accordance with the target engine rotation speed that is being reduced based on the target engine rotation speed reduction rate during an engine stopping process.

4. The control device of the hybrid vehicle according to claim 1, wherein the crank angle predicted stop position, the crank angle integration target value, the target engine rotation speed reduction rate, and the target crank angle are calculated so as to include a crank angle change during a response delay up to reflection of the torque instruction value of the motor on the engine rotation speed from calculation of the torque instruction value.

* * * * *